United States Patent [19]

Fennell et al.

[11] Patent Number: 5,335,357
[45] Date of Patent: Aug. 2, 1994

[54] SIMULCAST SCHEDULER

[75] Inventors: Robert D. Fennell, Coral Springs; David R. Petreye, Lake Worth, both of Fla.

[73] Assignee: Motorola, Inc., Schaumburg, Ill.

[21] Appl. No.: 93,130

[22] Filed: Jul. 16, 1993

Related U.S. Application Data

[63] Continuation of Ser. No. 632,575, Dec. 24, 1990, Pat. No. 5,287,550.

[51] Int. Cl.$^5$ ..................... H04B 7/005; H04B 7/185
[52] U.S. Cl. ................................ 455/51.2; 455/13.2; 455/56.1
[58] Field of Search ................. 455/9, 10, 12.1, 13.1, 455/13.2, 15, 16, 17, 51.1, 51.2, 53.1, 54.1, 56.1, 67.1, 67.6; 379/59, 60; 375/106, 107, 12; 370/100.1, 104.1, 108

[56] References Cited

U.S. PATENT DOCUMENTS

| | | | |
|---|---|---|---|
| 4,696,051 | 9/1987 | Breeden | 455/51.2 |
| 4,850,032 | 7/1989 | Freeburg | 455/51.2 |
| 5,014,344 | 5/1991 | Goldberg | 455/56.1 |
| 5,038,403 | 8/1991 | Leitch | 455/51.2 |

Primary Examiner—Reinhard J. Eisenzopf
Assistant Examiner—Lisa Charouel
Attorney, Agent, or Firm—Kelly A. Gardner; Thomas G. Berry

[57] ABSTRACT

A selective call terminal receives selective call information from a message originator. A transmission time is scheduled for the selective call message by a selective call system controller. A plurality of simulcast schedulers coupled to the controller receive and store the selective call message and the transmission time. The simulcast schedulers have an equalization time stored therein, the equalization times for each of the simulcast schedulers calculated by the system controller using simulcast receivers for measuring signal time differences between transmitters. The simulcast schedulers provide the selective call message to corresponding transmitters at a time to transmit the selective call message, the time determined by the transmission time and the equalization time. Transmitter settings and code types defining signalling protocol, data bit rate, carrier frequency and transmitter power, for each message are varied in accordance with information received from the system controller. Each simulcast scheduler can also function as a selective call terminal for a local selective call system.

9 Claims, 11 Drawing Sheets

SIMULCAST SCHEDULER

This is a continuation of application Ser. No. 07/632,575, filed Dec. 24, 1990, now U.S. Pat. No. 5,287,550.

FIELD OF THE INVENTION

This invention relates in general to non-realtime transmissions, and in particular to selective call simulcast transmissions.

BACKGROUND OF THE INVENTION

As selective call network coverage areas grow to meet consumer demand in larger metropolitan areas, the selective call network service provider must necessarily add additional transmitters to provide a larger coverage area. Interference between signals sent from the various transmitters causes difficulty in reception. This interference occurs in areas which can receive transmissions from two or more transmitters.

As pictured in FIG. 1, a selective call terminal 10 encodes a selective call signal and provides the signal to system controller 12 for distribution to multiple transmitting antennas 15, each transmitting antenna having an associated coverage area 20. The system coverage area comprises all of the coverage areas 20. The signal may be provided from the controller 12 to the antennas 15 via radio frequency (RF) link or via hard-wired links, for example the public switched telephone network (PSTN), or a mixture thereof. Therefore, due to differing path lengths and switching equipment, the transmission of the signal from one transmitting antenna 15 may be delayed from the transmission of the signal from another antenna 15 because the signal arrived at the second antenna later than it arrived at the first antenna 15. It is this delay which causes interference in the overlapping coverage areas 25.

To overcome the signal interference due to staggered transmitting times, solutions have been proposed to provide for simultaneous transmission from the transmitting antennas 15. This process is called simulcast transmission.

One simulcast solution, described in European Patent Application 86105017.7, filed Apr. 11, 1986 and published as Publication Number 0 198 448 on Oct. 22, 1986, involves placing large coils called equalization coils in the transmission path from the controller to each transmitter. By manually varying the amount of coil inserted into the transmission path while monitoring the reception in the area of overlapping coverage, the delay between the signal leaving the terminal 10 and arriving a transmitting antenna 15 is adjusted until the signal arrives at all of the transmitting antennas 15 simultaneously. Once the coils have been set to a preferable length utilized, the reception in the overlapping coverage areas should be improved. Yet, the equalization coils do not take into affect the variations in the length of the transmission path when the PSTN is utilized. As is well known in the art, the PSTN service provider can route the call in any manner, at the providers option, as long as it originates and ends at the required locations. Such random rerouting may increase the length of the transmission path from the terminal 10 to the transmitting antenna 15 and/or may insert additional equipment into the transmission path further varying the time the signal arrives at the transmitter.

Another simulcast solution described in European Patent Application 86104869.2, filed Apr. 9, 1986 and published as Publication Number 0 197 556 on Oct. 15, 1986 (Technomen), maintains a relative time between transmissions from base stations by periodic communication between the base stations. The simulcast transmission method of Technomen synchronizes the transmission of the signals from the transmitters by accurate atomic clocks which are periodically adjusted for the relative time. Regrettably, such a system is extremely costly due to the atomic clocks and extremely difficult to maintain simulcast transmission conditions because of the variation of the delay. Periodic correction of the relative time does not improve the transmission of the signal between corrections. Furthermore, the Technomen simulcast transmission system must be periodically shut down for relative time determinations.

Thus, what is needed is a simulcast system capable of synchronizing the transmission of the signal from the transmitters without regard to variations in the length of the terminal-to-transmitter transmission path, yet not requiring highly accurate measure of terminal-to-transmitter delay times requiring expensive atomic clocks.

SUMMARY OF THE INVENTION

In carrying out the objects of the invention in one form, there is provided a terminal which receives information and generates a selective call message and a transmission time in response thereto. A plurality of simulcast schedulers receive and store the selective call message and the transmission time, and provide the selective call message to a corresponding one of a plurality of transmitters at a time to transmit the selective call message, the time determined in response to the transmission time stored therein.

DETAILED DESCRIPTION OF THE INVENTION

Figure 1:
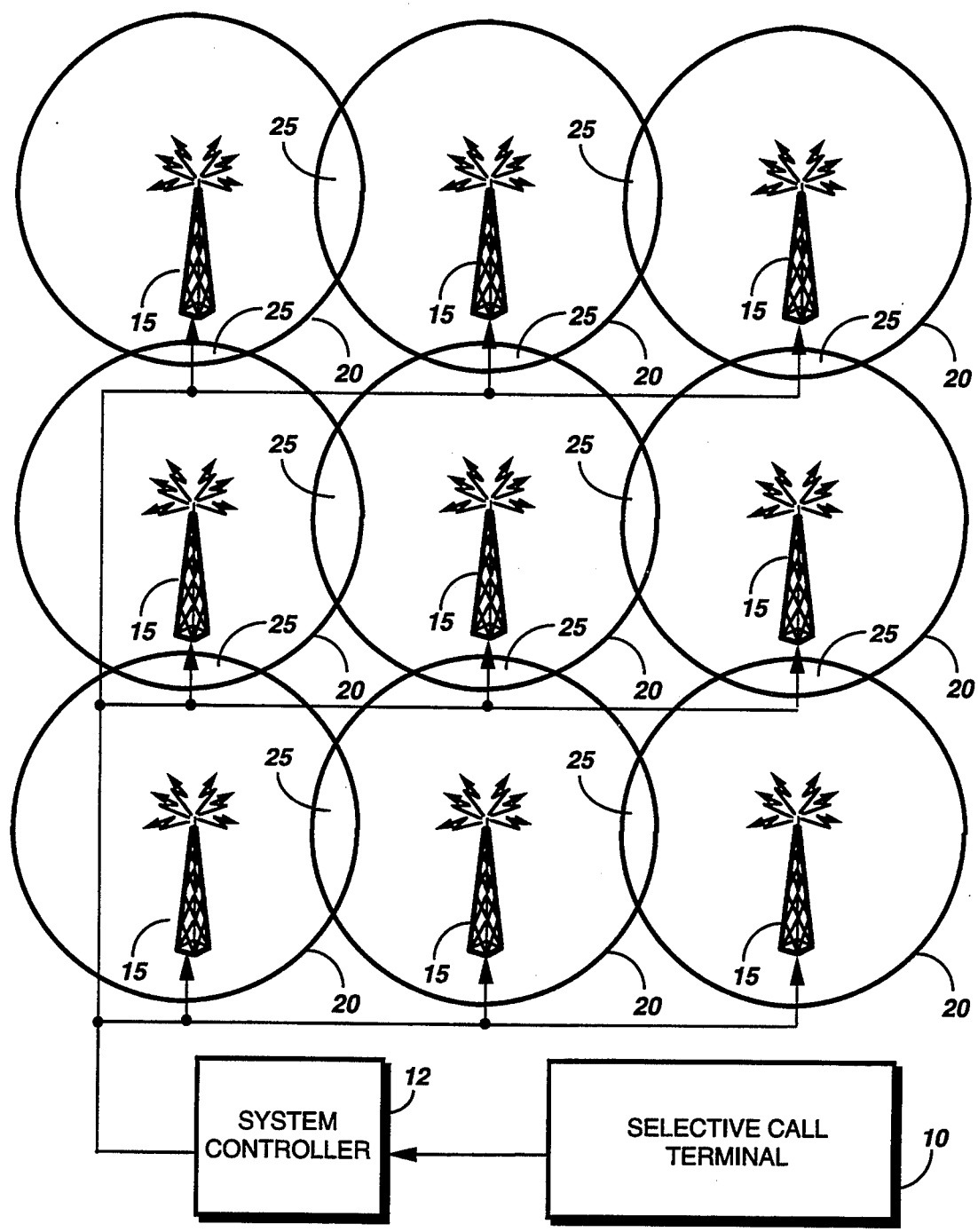
FIG. 1 is a diagram of a prior art selective call transmission system having multiple transmitters.
Figure 2:
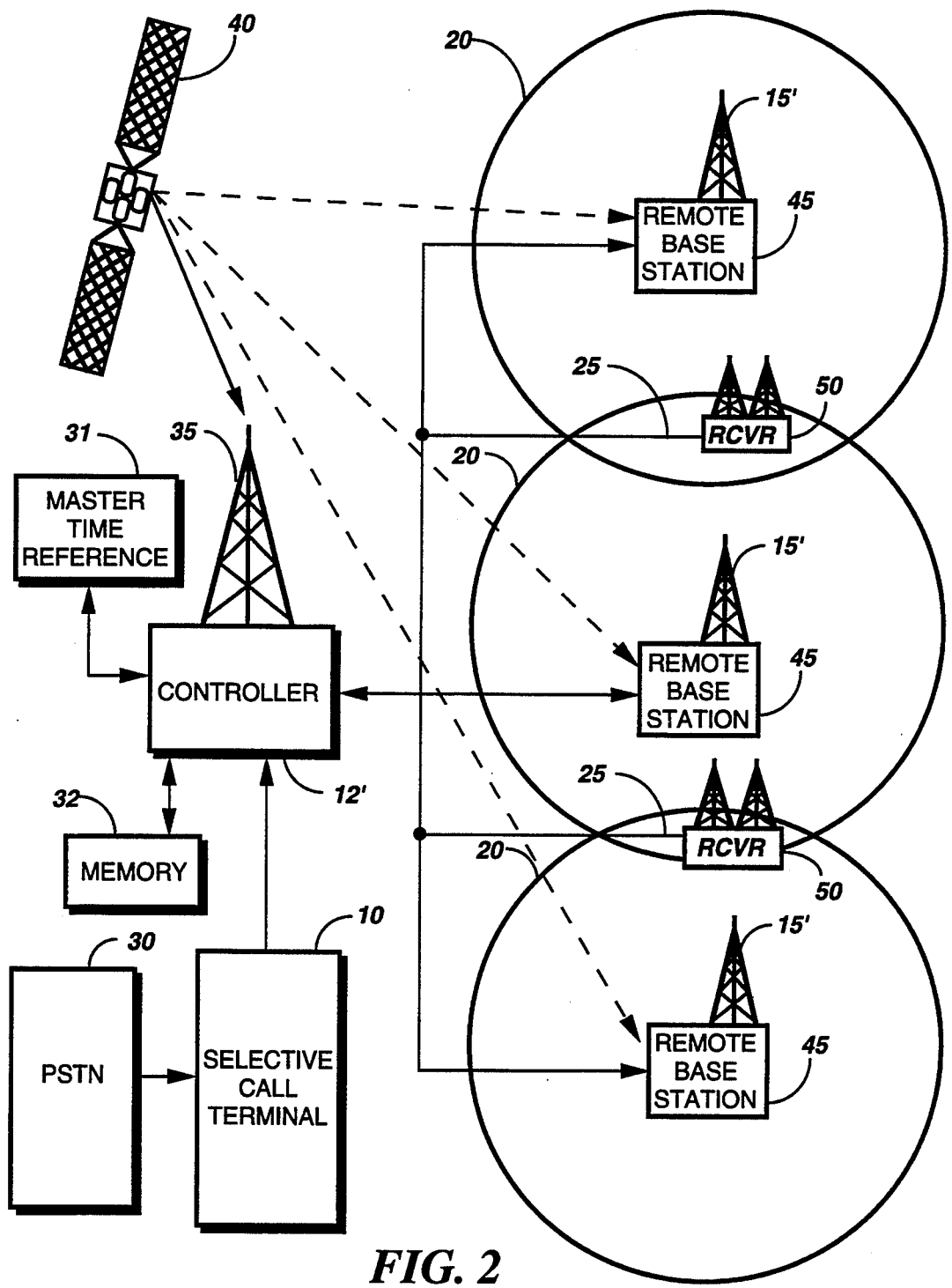
FIG. 2 is a diagram of a preferred embodiment of a selective call system according to the present invention.

Referring to FIG. 2, the preferred embodiment of a selective call system of the present invention comprises a conventional selective call terminal 10, also referred to as a central terminal, coupled to the public switched telephone network (PSTN) 30 for receiving selective call information from selective call message originators. The terminal 10 queues the information received, and provides to a controller 12' the selective call information, from which the selective call message, the code type or signalling protocol for encoding the information, and the preamble and frame information to be used to transmit the information can be derived. The controller 12' packetizes the information and transmits the packets and the transmit time for the selective call messages in the packet to a plurality of remote base stations 45. The transmit time for the selective call messages is synchronized to a master time reference 31, such as a highly accurate oscillator. The master time reference 31 is utilized by the controller 12' to schedule simulcast broadcast from a plurality of transmitting antennas 15 coupled to the remote base stations 45.

The preferred embodiment of the present invention, though, does not require a highly accurate oscillator to maintain the accuracy of the master time reference 31. An antenna 35 coupled to the controller 12' receives real time information in the form of a satellite timing signal from a satellite 40, as part of the Global Positioning System (GPS), in orbit around earth. The GPS satellites broadcast a satellite timing signal every second which can be received by the antenna 35. The real time information updates the master time reference 31 coupled to the controller 12'.

The remote base stations 45 are coupled to the controller 12' by hardwire, as shown, or, alternatively, by radio frequency (RF) data links, for high speed provision of the selective call information to the base stations 45 and for communicating status information back to the controller 12'. The hardwire connections between the controller 12' and the remote base stations 45 can be dedicated lines or coupling via the PSTN.

A memory 32 may be used by the controller 12' to buffer packets in order to control the amount of information supplied downstream to the base stations 45. The packets are stored at the remote base stations 45 until the scheduled transmission time. If sufficient memory is available at the remote base stations 45 to handle the traffic level of the selective call system, the memory 32 would not be necessary. With limited memory at the remote base stations 45, though, a memory overflow could occur. A memory overflow occurs at a remote base station 45 when the stored packets approaches the memory capacity of the base station 45. To prevent memory overflow, a worst case overflow scenario is used to calculate a system overflow constant K which the controller 12' uses to decide when to store packets in the memory 32. In response to an unsolicited alarm response generated by a remote base station 45, the controller 12' buffers additional packets, allowing the remote base station time to correct its overflow situation.

The controller 12' can, alternatively, control the downstream flow of information by sending a scheduling inquiry to the remote base stations 45 to ask for their current memory status. The base stations 45 transmit a signal indicating their memory status. The signal is received by a simulcast receiver 50 which provides a signal across hard wire connections to the controller 12' advising the controller 12' of the current storage allocation at the base stations 45.

The selective call signals transmitted from the remote base stations 45 are simulcasted according to the present invention by broadcasting the selective call message from each base station 45 at a time determined by the transmission time sent to the base station 45 by the controller 12' and by an equalization time stored in each base station. The equalization time for each base station 45 is calculated by the controller 12' from information provided to the controller 12' by the simulcast receivers 50 located in the overlapping dual coverage areas 25. The simulcast receivers 50 receive signals from the remote base stations 45 transmitting into the overlap areas 25 and signal the controller 12', providing a time difference of the signals received. The controller 12' calculates equalization times for the remote base stations 45 from the signals received from the simulcast receivers 50. The controller 12' packetizes the equalization times and forwards them to the appropriate base stations 45 for storage therein.

Alternatively, the base station 45 can calculate the equalization times from satellite timing signal transmitted from the GPS satellite 40. Each base station 45, would have coupled thereto a GPS satellite receiver for receiving the satellite timing signals from the GPS satellite 40. The satellite timing signals would synchronize the timing references at each of the base stations 45 with the master time reference 31. A conventional GPS satellite receiver receives satellite timing signals from several GPS satellites and automatically corrects the time to a real time reference, such that any location on the globe would receive the same real time reference, The satellite timing signals would synchronize the timing references at each of the base stations 45 with the master time reference 31 without the need for the simulcast receivers 50.

Figure 3A:
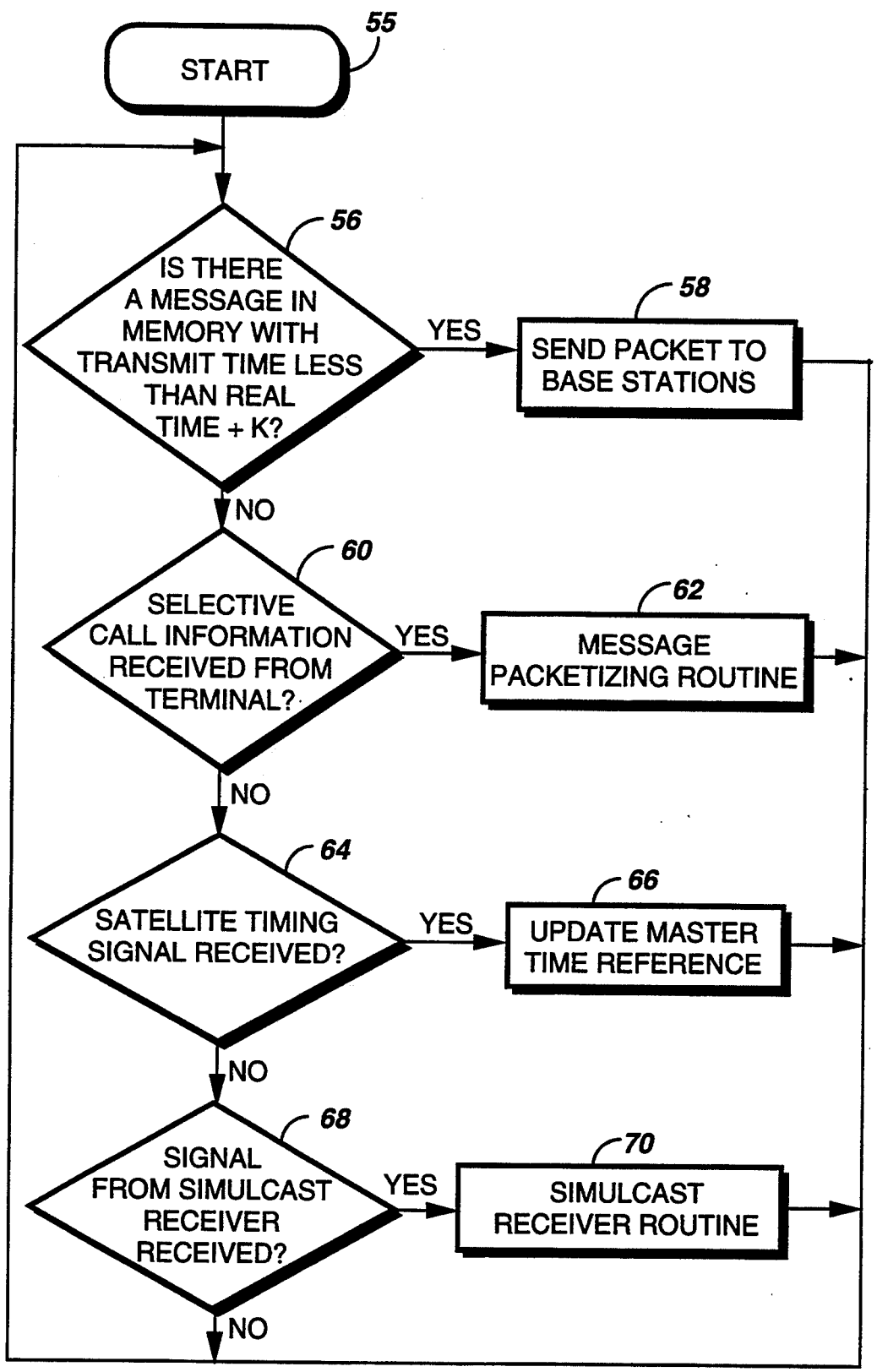
FIGS. 3A, 3B, and 3C are a flowchart of the preferred operation of the selective call controller according to the present invention.
Figure 3B:
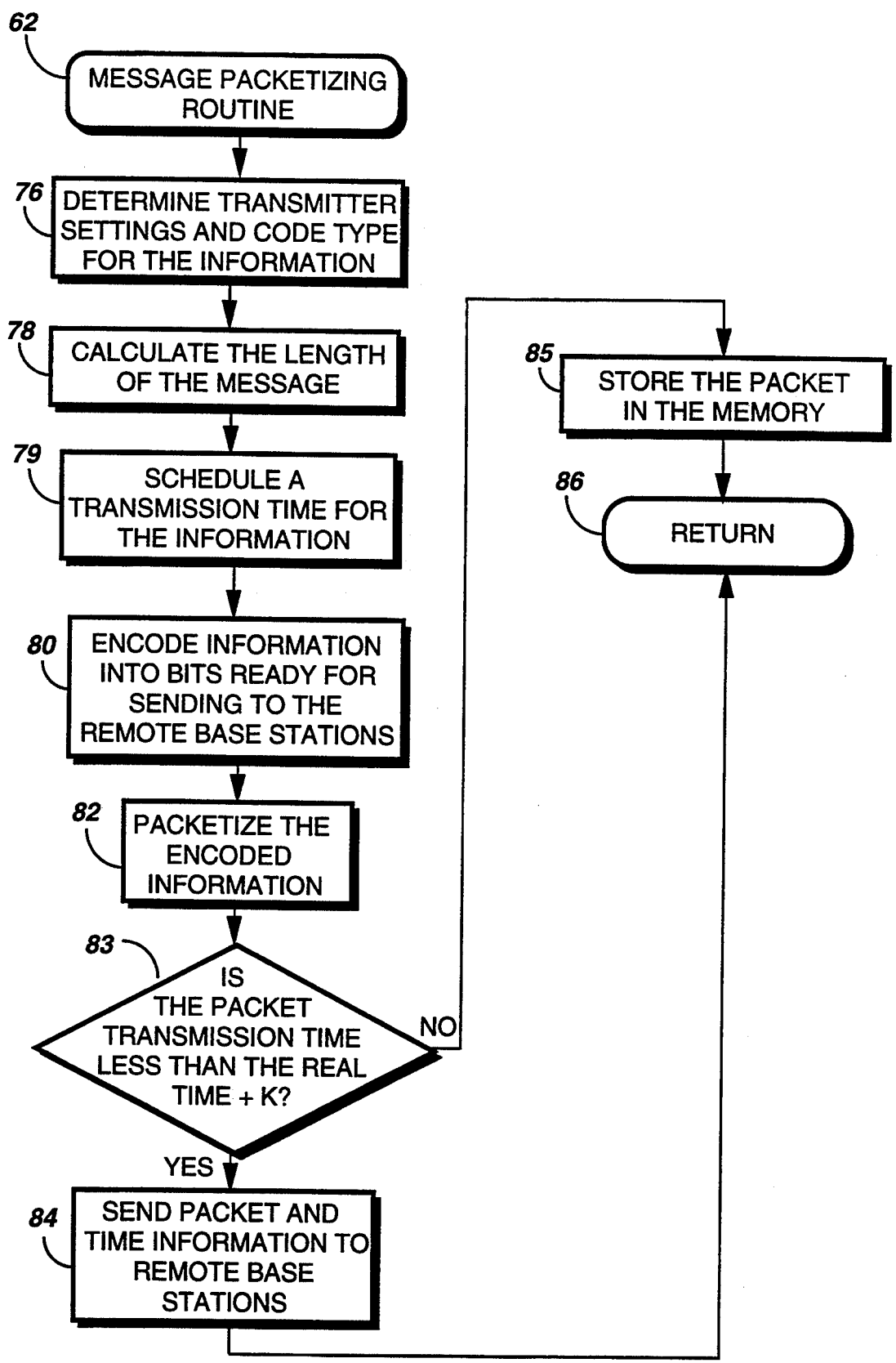
Figure 3C:
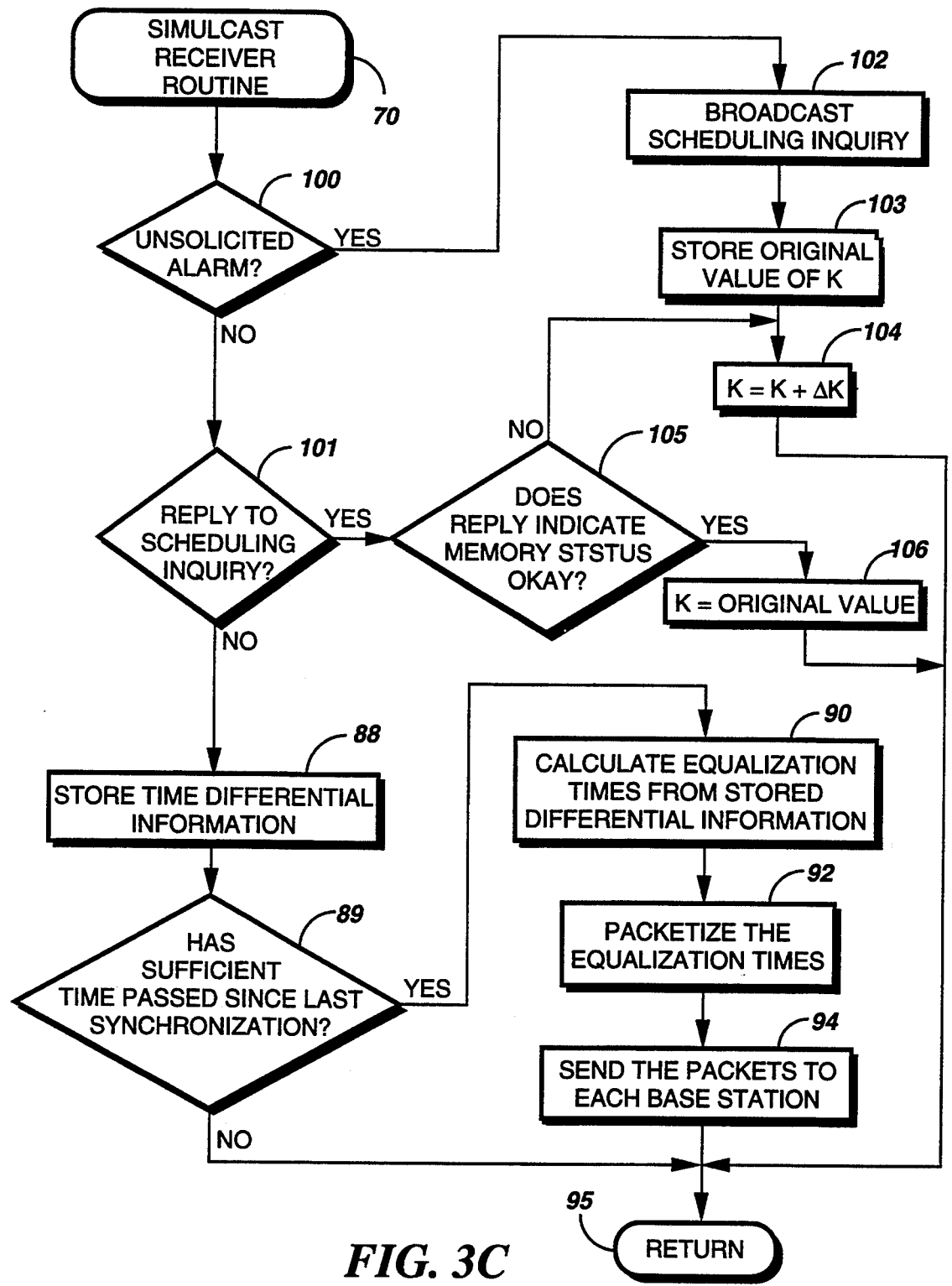

Referring to FIGS. 3A, 3B and 3C, the preferred operation of the controller 12' starts 55 upon energizing the controller 12'. The memory 32 (FIG. 2) is checked 56 to determine if a packet is stored therein with a transmission time less than the current real time plus the system overload constant time K. If a packet is stored in the memory 32 with a transmission time less than the real time plus the time K 56, the packet is sent 58 to the remote base stations 45. Processing then returns to check 56 the memory 32 to determine if another packet therein has a transmission time less than real time plus K.

If no packets in the memory 32 have a transmission time less than the real time plus K 56, the input from the terminal 10 is checked 60 to see if selective call information has been received therefrom. When selective call information is received 60 from the terminal 10, the message packetizing routine 62 is performed and processing returns to check 56 the memory 32.

If selective call information has not been received 60 from the terminal 32, the input from the antenna 35 is checked 64 to see if a satellite timing signal has been received. If a satellite timing signal is received 64, the master time reference 31 is updated 66 and processing returns to check 56 the packets in the memory 32. Using GPS satellites, this would occur every second.

If a signal from the simulcast receiver 50 (FIG. 2) is detected 68 at the hardwire input to the controller 12', the controller 12' performs a simulcast receiver routine 70 after which processing returns to check 56 the packets in the memory 32. Processing remains in the loop of checking packets stored 56, checking the input from the terminal 60, checking the input from the antenna 64, and checking the hardwire input 68, 72 until a signal is detected or a packet transmission time is detected.

The message packetizing routine 62 determines the transmitter settings and code type for the selective call information received 76. The length of a selective call message comprising the selective call information in the format code indicated is calculated 78 and a transmission time for the selective call message is scheduled 79. The information including the selective call information, the transmitter settings, the code type, the length of the message, and the transmission time are encoded 80 into bits ready for sending to the remote base stations 45. The encoded information is packetized 82 and the packet transmission time is checked to determine 83 whether the transmission time is less than the real time plus the system overload constant time K. If the packet transmission time is less than the real time plus the time K 83, the packet is sent 84 to the remote base stations 45. If, on the other hand, a packet transmission time is more than the real time plus the time K 83, the packet is stored 85 in the memory 32 and processing returns 86 to the idle loop awaiting detection of an input 60, 64, 68 or scheduled transmission time less than real time plus K 56.

The simulcast receiver routine 70 begins by determining 100 whether an unsolicited alarm response has been received from a remote base station 45 via a simulcast receiver 50. If an unsolicited alarm response has been received 100, a scheduling inquiry is broadcast 102. A scheduling inquiry is a signal sent by the controller 12' to one of the remote base stations 45 to request an update on the memory status at the base station 45. In a less preferred embodiment, the controller 12' could periodically broadcast a scheduling inquiry to each of the base stations 45 and dynamically vary the value of the system overflow constant K in response thereto. In the preferred embodiment of the present invention, a scheduling inquiry is broadcast 102 only in response to an unsolicited alarm response.

Processing continues by storing the original value of the system overflow constant K 103. The value of the overflow constant K is then increased 104 by a predetermined portion ΔK. Processing then returns 95 to the input idle loop awaiting detection of an input 60, 64, 68 or scheduled transmission time less than real time plus the new constant time K 56.

If the signal from the simulcast receiver 50 is not an unsolicited alarm response 100, processing determines whether the signal is a response to a scheduling inquiry 101. If the signal is a response to a scheduling inquiry 101 indicating the memory status of a remote base station 45, the reply is compared to memory capacity information stored in the memory 32 to determine if the reply indicates that the memory status is good 105. If the scheduling inquiry reply indicates that the memory status is good 105, the system overflow constant K is reset 106 to its original value and processing returns 95 to the input idle loop. If the reply indicates that the memory status is not good 105, the constant K is again increased by a predetermined amount ΔK 104 and processing returns 95 to the input idle loop.

If the signal from the simulcast receiver 50 is not an unsolicited alarm response 100 and is not a reply to a scheduling inquiry 101, the signal is time differential information to be used by the controller 12' to maintain a simulcasting system. The time differential information received from the simulcast receiver 50 is stored 88. If sufficient time has passed since the last synchronization 89, the equalization time for each of the base stations 45 is calculated 90. The equalization times are packetized 92 and sent 94 to the corresponding base stations 45. Processing then returns 95 to the idle loop. If sufficient time has not passed since the last synchronization 89, processing returns 95 to the input idle loop awaiting detection of an input 60, 64, 68 or scheduled transmission time less than real time plus the new constant time K 56.

Figure 4:
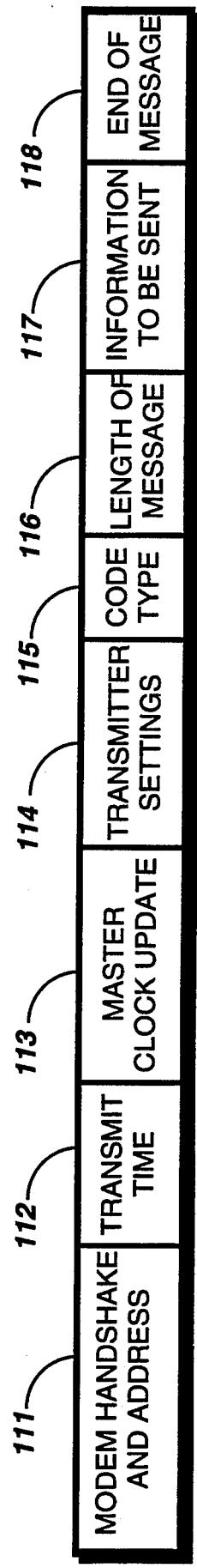
FIG. 4 is a diagram of a preferred embodiment of a signal packet protocol according to the present invention.

Referring next to FIG. 4, the signalling format of a packet 110 of information to be provided from the controller 12' to the remote base stations 45 (FIG. 2) allows for forward error correction of the information received. The packet 110 comprises a modem handshake and address 111 for wake-up and synchronization of the remote base stations 45 in a conventional manner. Next, the transmission time 112 is sent indicating the real time for transmission of the selective call message. Since selective call messages are not real time communication, the time difference between when an originator calls up the central terminal 10 and the time the message is sent is unapparent to the originator.

Master clock update information 113 includes the equalization times sent to the remote base stations 45 for use in simulcasting the selective call messages at the transmit times 112 indicated. The equalization times are calculated as described above from the time differential information measured by the simulcast receivers 50 between signals transmitted from the remote base stations 45 and received in the overlapping areas 25 (FIG. 2).

Transmitter settings 114 are provided for altering the settings the components of the remote base station 45 during encoding and transmitting of the selective call message as described below. The transmitter settings 114 could include information for altering transmitter power, filter characteristics, data rate and carrier frequency of the signal transmitted by the base station. The communication of the transmitter settings 114 with each selective call message can allow the controller 12' to the base station 45 in a manner that would allow broadcasting a selective call message on one of a plurality of selective call channels within one of the plurality of system coverage areas.

Next, the code type 115, or signalling protocol, of the selective call message is provided. The code type information 115 indicates to the remote base station 45 how to encode the selective call information. For example, selective call messages could be encoded in one of the conventional code types such as POCSAG or Golay Sequencing Code. Next, the length of the message 116 is sent so that the base station 45 can calculate the transmission time duration for the message. The length of the message 116 is followed by the selective call message information 117. An end-of-message code 118 follows the selective call message, indicating that the base station 45 can disconnect from communicating with the controller 12'. The end-of-message code 118 is also utilized by the base station 45 to verify that the information received is correct or error free. Thus, a packet 110 of information comprising selective call message information 117 and transmission time information 112 is provided to the remote base stations 45 with all of the necessary information to encode and simulcast transmit the selective call message from the base stations 45.

Figure 5:
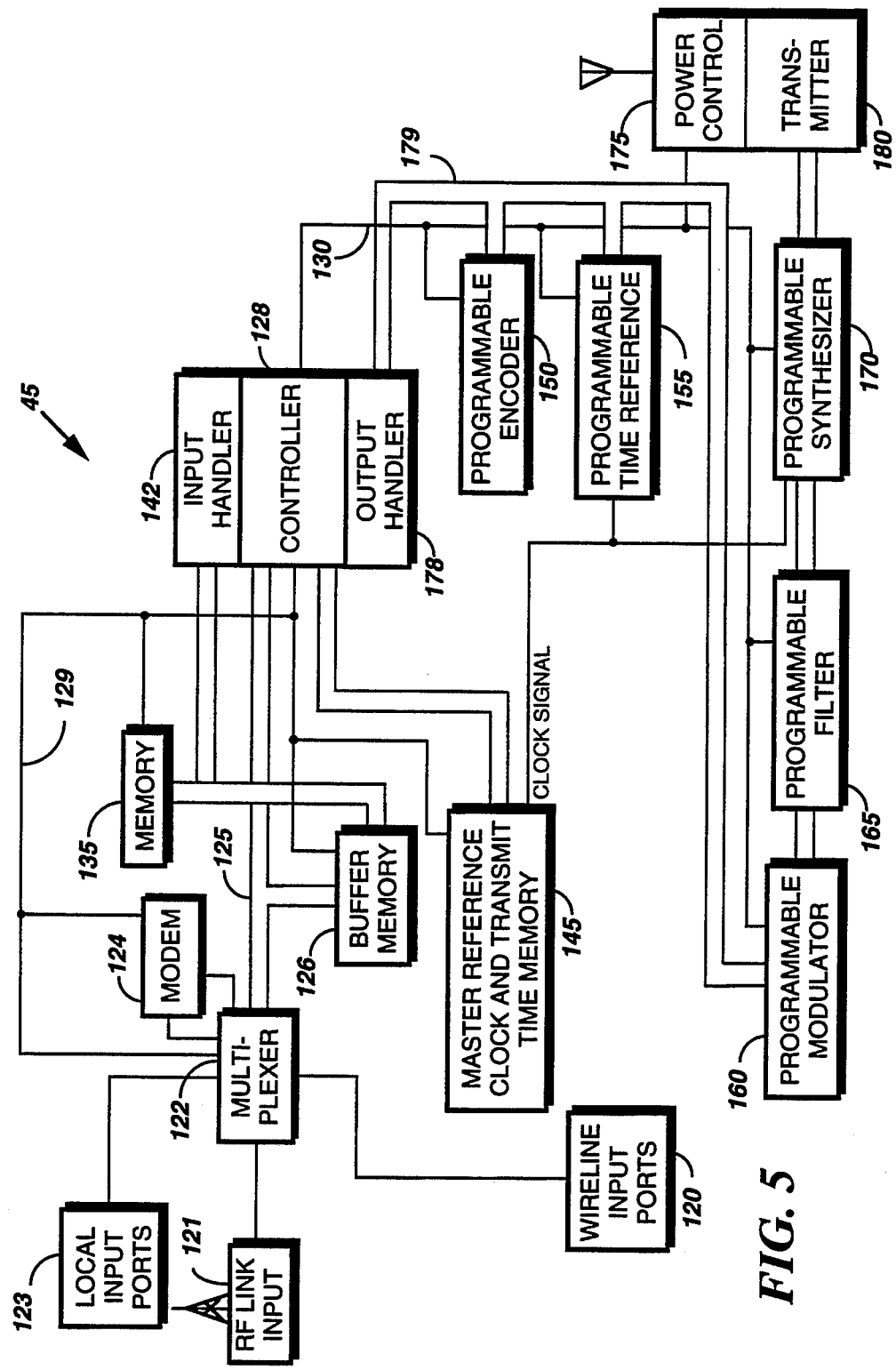
FIG. 5 is a diagram of a preferred embodiment of a remote base station according to the present invention.

Referring to FIG. 5, the remote base station 45 receives the selective call information from the central terminal 10' as a high speed signal at wire line input ports 120 or an RF link input 121. The information is provided to a multiplexer 122 for handling thereof. In addition, the remote base stations 45 can act as a central terminal for a selective call system and be networked to the central terminal 10' (FIG. 2) for operation of a selective call system having a larger coverage. The remote base station 45 can receive local selective call information via conventional local input ports 123 which are similarly coupled to the multiplexer 122. A modem 124 is coupled to the multiplexer 122 for analog-to-digital signal demodulation.

The data bus 125 carries the data from the multiplexer 122 and to a buffer memory 126 and a microcomputer controller 128. The controller 128 controls the functions of various components of the base station 45, such as the multiplexer 122 and the buffer memory 126 via control signals on lines 129 and 130. The controller 128 examines the information received and stored in the buffer memory 126 and allocates the information read from the buffer memory 126 to an address in a memory 135 in a predetermined manner based upon the protocol of transmission and the order in which the information will be broadcast. A transmit time reference clock and memory 145 performs two functions. First, the computer controller 128 through the input handler 142 stores into the memory of the transmit time reference clock 145 transmission times of the items stored in the memory 135 and their assigned address therein. Second, the computer controller 128 checks the transmit time reference clock and memory 145 to determine when information is to be retrieved from the memory 135 and to be provided to the input handler 142 for broadcast.

The computer controller 128 also signals, via a control line 130, a programmable encoder 150, a programmable time reference 155, a programmable modulator 160, a programmable filter 165, a programmable frequency synthesizer 170 and a transmitter power control 175 according to the transmitter settings and the code type information loaded from the memory 135 to the input handler 142. A clock signal is provided from the reference clock 145 to the programmable time reference 155 and the programmable frequency synthesizer for use thereby.

An output handler 178 under the control of the controller 128 provides the selective call message to the bus 179. The programmable encoder 150 encodes the selective call message according to the protocol utilized in a manner well known to those skilled in the art. The time reference 155 maintains synchronization between real time and the signal being broadcast for data rate generation. The programmable modulator 160 and the programmable filter 165 prepare the signal for transmission by a transmitter 180. The programmable filter could be a programmable splatter filter wherein the filter characteristics could be altered in response to the transmitter settings.

The programmable synthesizer 170 generates the carrier wave for the selective call signal and the transmitter 180 transmits the selective call signal at the power specified by the power controls 175. The power controls 175 can be a programmable attenuator for controlling the output power of the transmitter 180.

Figure 6A:
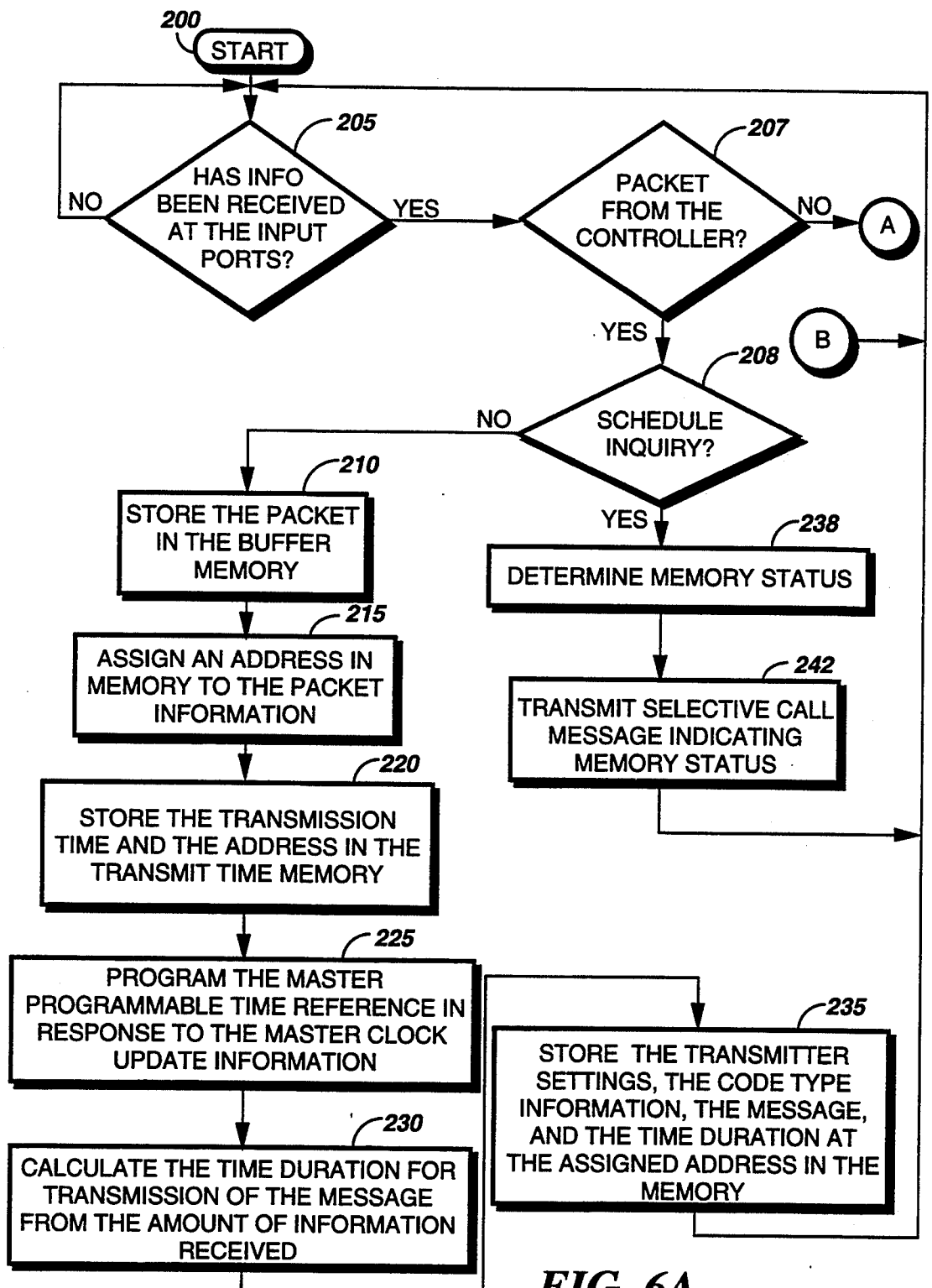
FIGS. 6A and 6B are a flowchart of the preferred operation of an input handling routine of a remote base station according to the present invention.
Figure 6B:
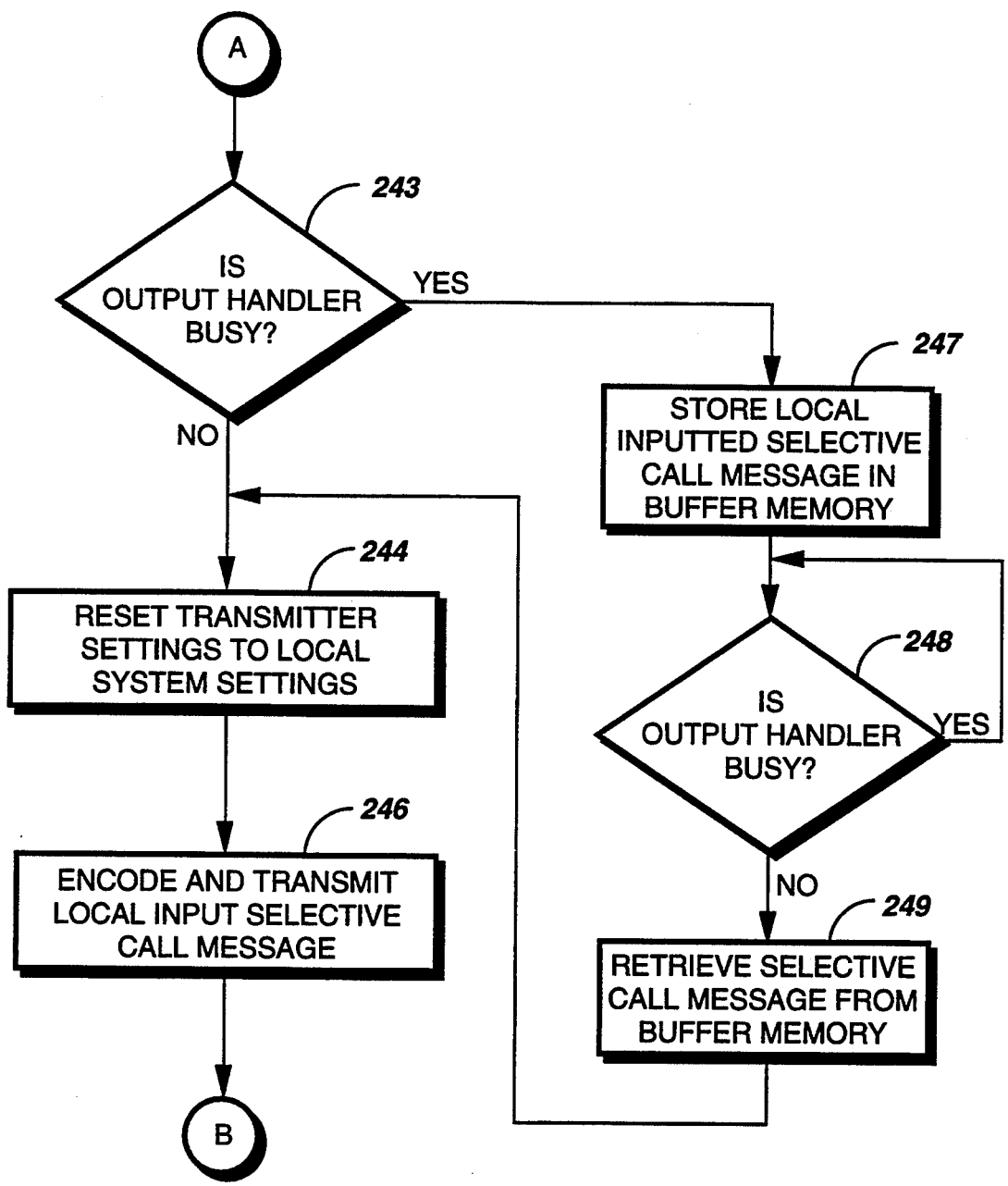

Referring to FIGS. 6A and 6B, a flow chart of the input handler processing of information is shown. After energizing 200 the remote base station 45 (FIG. 5), processing enters an idle loop awaiting information to be received 205 at one of the input ports 120, 121, 123 as indicated by the multiplexer 122. If information has not been received 205 at one of the input ports, processing remains in the idle loop. If information is received 205, processing determines 207 whether the information is a packet from the controller 12'. When a packet is received 207 from the controller 12', the packet is examined to determine 208 if it is a schedule inquiry. If the packet is not a schedule inquiry 208, the packet is stored 210 in the buffer memory 125 (FIG. 5). An address in the memory 135 is assigned 215 to the packet of information. The transmission time from the packet of information and the address assigned are stored 220 in the transmit time memory 145 (FIG. 5). The time correction factor stored in the computer controller 128 is updated 225 in response to the master clock update information in the packet of information received.

Next the selective call message information is examined. The time duration for transmission of the message information is calculated 230 from the length of message information 116 (FIG. 4) received in the packet of information. The transmitter settings, the code type information, the selective call message information, and the time duration for transmission of the message are stored 235 at the assigned address in the memory 135 (FIG. 5).

If the packet received is a schedule inquiry 208, the controller 128 determines 238 the memory status of the memory 135 and the buffer memory 126. According to the preferred embodiment of the present invention, the master controller 12' queries the remote base stations 45 in order to determine how much information is stored in memory awaiting transmission in response to reception of an unsolicited alarm response from the base station 45. In this manner, the controller 12' can control the down stream flow of information to the remote base stations 45. The computer controller 128 composes and transmits 242 to the controller 12' a selective call message indicating the memory status of the memory 135 and the buffer memory 126. The selective call message is broadcast from the transmitter 180. Alternatively, the scheduling inquiry reply could be transmitted to the controller 12' via the modem 124 and one of the data links 120, 121. The selective call message can indicate percent of memory in use or can indicate memory in use and the controller 12' can retrieve information from the memory 32 (FIG. 2) indicating the memory capacity of the base stations 45.

If the information at the input ports is not a packet from the controller 207, the information is from the local input port and is handled in a manner well known to those skilled in the art except as follows. The output handler 178 (FIG. 5) is checked 243 to see if it is busy with transmitting selective call messages from the controller 12' (FIG. 2). If the output handler 178 is not busy 243, the transmitter settings of the various components are reset 244 to the settings for the local selective call system. The transmitter settings of the local selective call system are stored in the controller 128. The selective call message from the local input is then encoded and transmitted 246.

If the output handler 178 is busy 243 when the local input selective call message is received, the selective call message is stored 247 in the buffer memory 126 (FIG. 5) and processing enters an idle loop to await a time when the output handler 178 is not busy 248. When the output handler 178 is not busy 248, the selective call message is retrieved 249 from the buffer memory 126. The transmitter settings are reset 244 to the local system settings and the selective call message is encoded and transmitted 246.

Figure 7:
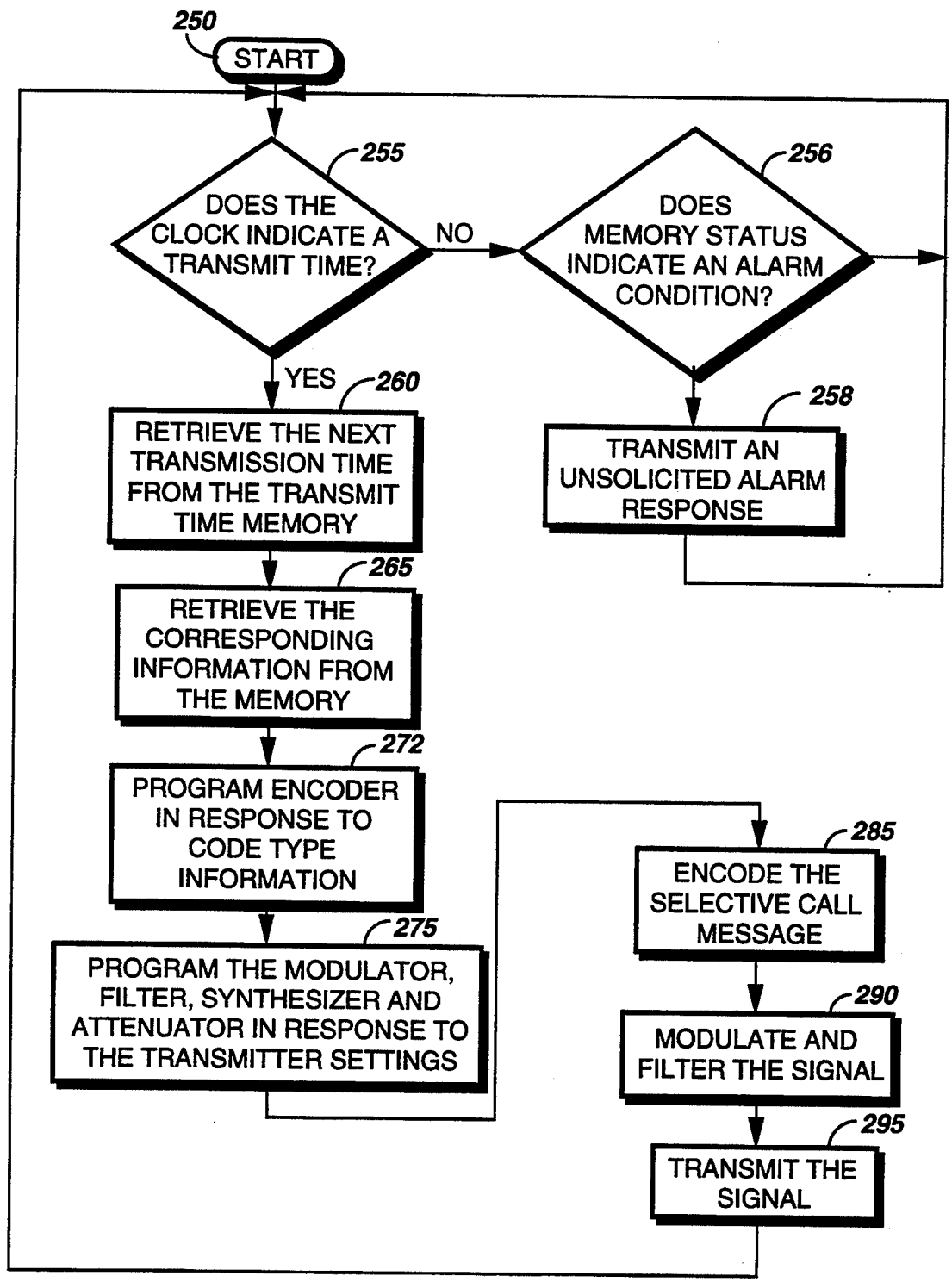
FIG. 7 is a flowchart of the preferred operation of an output handling routine of a remote base station according to the present invention.

Referring next to FIG. 7, the output handler routine is shown in flow chart form. Upon start-up 250, the master reference clock 145 (FIG. 5) is compared to transmissions time in the memory 145 to determine whether a transmit time stored in the memory 145 is indicated 255 by the real time. When a transmit time is indicated 255, the address corresponding to the transmit time in the memory 145 is retrieved 260, and the corresponding information stored at that address in the memory 135 is retrieved 265. The computer controller 128 then programs 272 the programmable encoder 150 and the programmable time reference 155 through appropriate signalling on the control line 130. The programmable encoder 150 is programmed 272 in accordance with the stored code type information. In this manner, the encoder 150 is programmed 270 to format the selective call message in accordance with one of a variety of predetermined signalling code formats. For selective call messages, formats such as POCSAG or GOLAY sequence code could be used. The programmable time reference 155 is programmed 272 in accordance with the code type information to control the data rate of the signal produced. For example, POCSAG formatted information would be broadcasted 512 bits per second while GOLAY sequence code information would be broadcasted 600 bits per second.

Next, the programmable modulator 160, the programmable filter 165, the programmable synthesizer 170, and the programmable power control 175 for the transmitter 180 are programmed 275 in accordance with the transmitter setting information stored with the selective call message information in the memory 135. The programmable modulator 160 and the programmable filter 165 complete the formatting of the selective call message into the appropriate coding. In a manner well known to those skilled in the art, the programmable filter 165, such as a programmable splatter filter, could select one of a plurality of filter characteristics in response to the transmitter setting information to band limit the modulated data to optimally minimize intersymbol interference and meet Federal Communication Commission splatter specifications. The programmable synthesizer 170 produces the carrier frequency onto which the selective call message will be modulated. In this manner, a master controller 12' can specify any of a plurality of carrier frequencies for selective call messages, therefore controlling a multiple channel selective call system. The power control 175, or programmable attenuator, controls the output power of the transmitter 180. The controller 12' can control different selective call systems by altering the power of transmission of selective call messages thereby denoting different coverage areas for the system in which the message is transmitted.

The selective call message information is then provided to the bus 179 where it is encoded 285, modulated and filtered 290, and ultimately transmitted 295. After transmission of this selective call message signal, processing returns to check 255 the reference clock and memory 145 to determine whether a transmit time stored in the memory 145 is indicated.

If a transmit time is not indicated 255, the current use status of the memory 135 and the buffer memory 126 is checked 256 to determine if the memory status indicates an alarm condition. If the memory status does not indicate an alarm condition 256, processing returns to determine 255 if a transmit time for a stored message is indicated. If a memory status alarm condition is indicated 256, the controller 128 transmits 258 via the transmitter 180 an unsolicited alarm response to a simulcast receiver 50 for response thereto as described above by the controller 12'. Alternatively, the unsolicited alarm response could be transmitted to the controller 12' via the modem 124 and one of the data links 120, 121.

Figure 8:
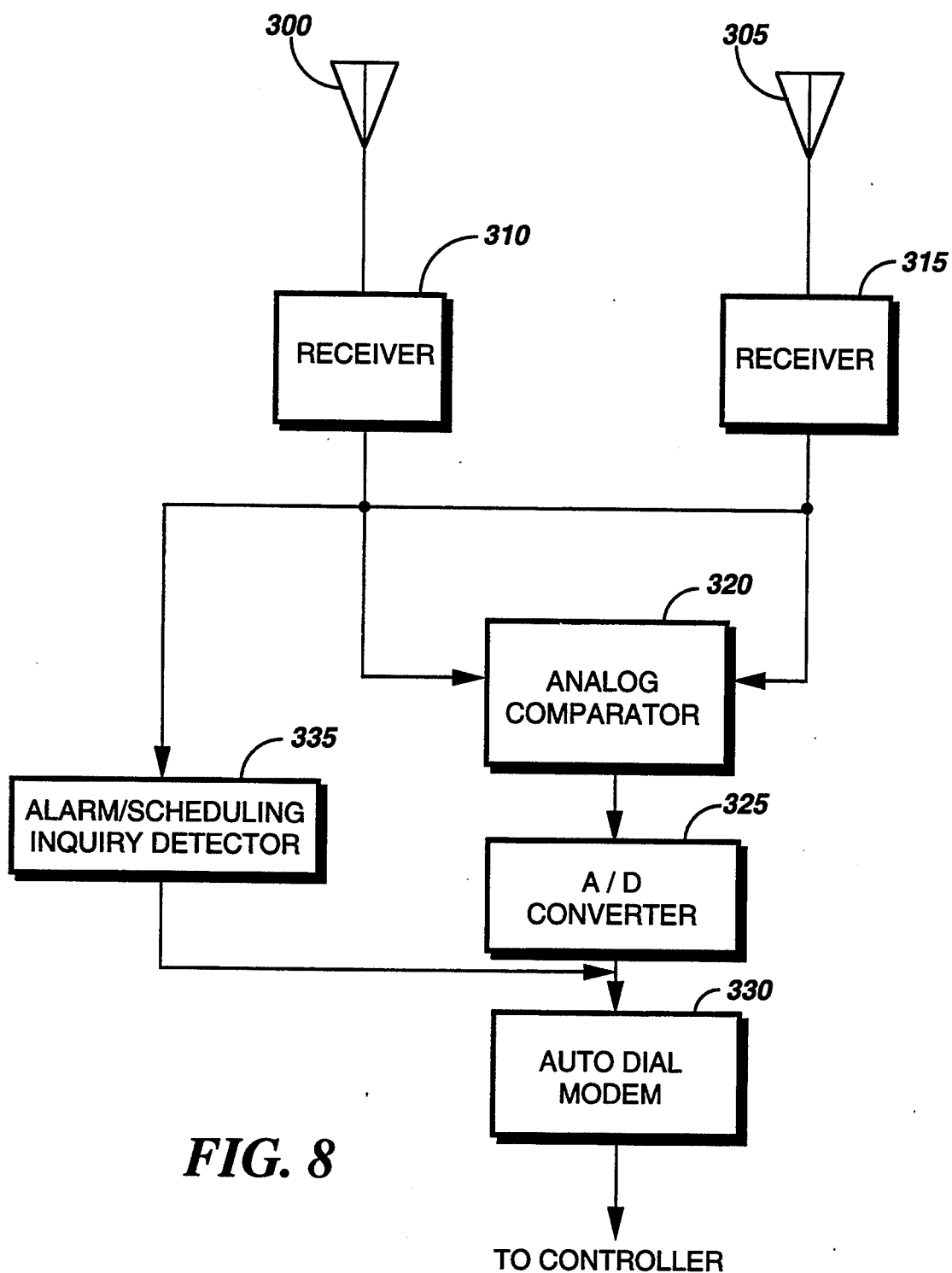
FIG. 8 is a block diagram of a preferred embodiment of a simulcast receiver according to the present invention.

Referring next to FIG. 8, the simulcast receiver 50 comprises two directional antennas 300 and 305. The simulcast receiver is located in overlapping coverage areas 25 (FIG. 2) and one directional antenna 300 is aimed towards one of remote base stations 45 having a coverage area 20 in the overlapping area 25. The other directional antenna 305 is aimed towards a second remote base station 45 having a coverage area 20 within the overlapping 25. Two dual matched receivers 310 and 315 process the signals received supplying them simultaneously to an analog comparator 320 for comparing the two signals received and determining the time shift or time difference between the signals. The time difference information is supplied to an analog to digital convertor 325 and thence to an auto dial modem 330 which calls up the controller 12' (FIG. 2) via the hard wire connection thereto for providing the time difference information.

Selective call information, such as unsolicited alarm responses and scheduling inquiry replies, have unique characteristics which an alarm and inquiry reply detector 335 coupled to the outputs of the receivers 310 and 315. The detector 335 detects the unique characteristics of the alarms and inquiry replies and passes them to the modem 330 and thence to the controller 12' for use thereby.

As explained above, the controller 12' utilizes the time difference information supplied from the simulcast receivers 50 to synchronize the remote base station 45 within the system. The information derived from the time difference information supplied to the controller 12' is supplied to the remote base stations as the master clock update information 88 (FIG. 4).

By now it should be appreciated that there has been provided a simulcast system capable of synchronizing the transmission of the signal from the transmitters without regard to variations in the length of the terminal-to-transmitter transmission path and not requiring highly accurate measure of terminal-to-transmitter delay times requiring expensive atomic clocks. The dynamic feedback system of the present invention allows for improved simulcast transmission and dynamic control of the transmission characteristics of the remote base stations 45 by the controller 12'.

What is claimed is:

1. A selective call network, comprising:
   terminal means for receiving selective call information and generating in response thereto a selective call message and a transmission time and for receiving simulcast delay information and calculating in response thereto a plurality of equalization times;
   a plurality of transmission means for transmitting said selective call message, wherein each of said plurality of equalization times corresponds to a different transmission means included in said plurality of transmission means; and
   a plurality of scheduling means, each of which is coupled to said terminal means and coupled to a corresponding one of said plurality of transmission means, each of said plurality of scheduling means comprising:
     receiving means for receiving said selective call message, said transmission time, and the corresponding equalization time included in said plurality of equalization times from said terminal means;

memory means for storing at least the corresponding equalization time received from said terminal means; and calculating means for calculating from said transmission time and the corresponding equalization time a simulcast time to provide said selective call message to said plurality of transmission means.

2. The selective call network of claim 1 wherein said plurality of scheduling means further comprises clock means for generating timing information, wherein said calculating means calculates said simulcast time in response to said transmission time, the corresponding equalization time, and said timing information.

3. The selective call network of claim 1 wherein said terminal means comprises:

first terminal receiving means for receiving said selective call information;

second terminal receiving means for receiving a satellite timing signal;

signal generation means for generating said selective call message in response to said selective call information and for generating said transmission time in response to said selective call information and said satellite timing signal; and routing means for providing said selective call message and said transmission time to said scheduling means.

4. The selective call network of claim 1, further comprising:

simulcast delay generating means coupled to said terminal means and said plurality of transmission means for receiving signals transmitted by said plurality of transmission means and generating therefrom said simulcast delay information for each of said plurality of transmission means, wherein said simulcast delay information is provided to said terminal means.

5. The selective call network of claim 1, wherein said terminal means comprises:

a selective call terminal for receiving selective call information; and a controller proximal to said selective call terminal for receiving said selective call information and generating therefrom said selective call message, wherein the controller is coupled to each of said plurality of transmission means by hardwired communication links.

6. The selective call network of claim 5, wherein each of said plurality of scheduling means comprises a remote base station coupled by a hardwire communication link to said controller for receiving said selective call message, said transmission time, and the corresponding equalization time thereover for storage in a random access memory.

7. The selective call network of claim 6, wherein each of said plurality of transmission means comprises a radio frequency transmitter located proximal to said remote base station for receiving said selective call message therefrom at said simulcast time.

8. A method for transmitting a selective call message in a selective call system comprising a terminal for receiving selective call information, a plurality of transmitters for transmitting the selective call message, and a transmitter controller for controlling the operation of the plurality of transmitters, the method comprising the steps of:

said transmitter controller receiving said selective call information from said terminal and generating therefrom said selective call message;

said transmitter controller calculating a transmission time for said selective call message;

said transmitter controller receiving simulcast delay information associated with each of said plurality of transmitters;

said transmitter controller calculating a plurality of equalization times from said simulcast delay information, wherein each of said plurality of equalization times is associated with a different transmitter included in said plurality of transmitters;

said transmitter controller transmitting said selective call message, said plurality of equalization times, and said transmission time to a plurality of schedulers, each of said plurality of schedulers coupled to a different one of said plurality of transmitters;

each of said plurality of schedulers storing said selective call message, said transmission time, and the associated equalization time corresponding to said one of said plurality of transmitters coupled thereto; and each of said plurality of schedulers providing said selective call message to said one of said plurality of transmitters at a simulcast time determined in response to said transmission time and the associated equalization time.

9. The method of claim 8, wherein the transmitter controller is further coupled to a plurality of radio frequency receivers and the method further comprises, prior to said step of said transmitter controller calculating said plurality of equalization times, the steps of:

said plurality of radio frequency receivers receiving signals transmitted by said plurality of transmitters;

said plurality of radio frequency receivers calculating from said signals said simulcast delay information for each of said plurality of transmitters; and said plurality of radio frequency receivers transmitting said simulcast delay information to said transmitter controller.

* * * * *